United States Patent [19]

Di Nunzio et al.

[11] 4,125,015
[45] Nov. 14, 1978

[54] PROCESS AND DEVICE FOR DETERMINING THE QUANTITY OF AIR INDUCTED BY AN INTERNAL COMBUSTION ENGINE

[75] Inventors: Vittorio Di Nunzio, Turin; Umberto Bigliani, Leumann-Collegno (Turin), both of Italy

[73] Assignee: Fiat Societa per Azioni, Turin, Italy

[21] Appl. No.: 795,599

[22] Filed: May 10, 1977

[51] Int. Cl.² ............................................. G01M 15/00
[52] U.S. Cl. ............................................ 73/118; 73/213
[58] Field of Search ........................ 73/118, 116, 213; 123/32 EA, 119 EC

[56] References Cited

U.S. PATENT DOCUMENTS 4,050,428  9/1977  Mosaki ........................ 73/118 X Primary Examiner—Jerry W. Myracle
Attorney, Agent, or Firm—Sughrue, Rothwell, Mion, Zinn and Macpeak

[57] ABSTRACT

The quantity of air inducted in a four cylinder Otto engine with fuel injection and an inlet throttle for each cylinder is determined by indirect measurement, unaffected by atmospheric pressure variations. The induction air pressure is measured by a transducer located between one of the throttles and its associated cylinder inlet valve, and the pressure is sampled, using an electronic gating system responsive to engine speed, within a precisely defined range (preferably 15°–25° after bottom dead center) of engine crankshaft angle.

7 Claims, 7 Drawing Figures

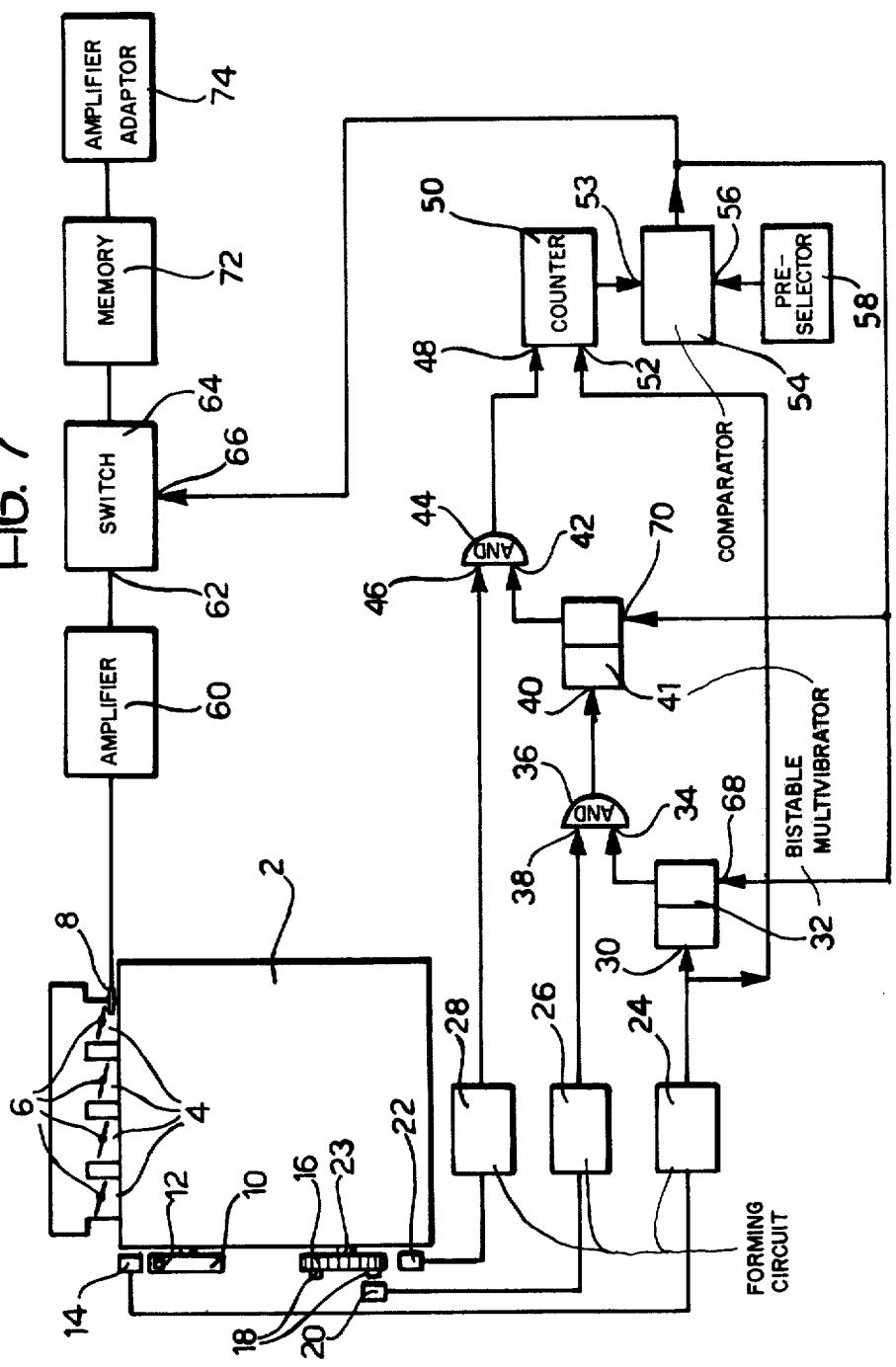

PROCESS AND DEVICE FOR DETERMINING THE QUANTITY OF AIR INDUCTED BY AN INTERNAL COMBUSTION ENGINE

The present invention relates to a process and device for determining the quantity of air inducted by an internal combustion Otto cycle engine, particularly for motor vehicles with electronically controlled fuel injection, having an inlet throttle for each cylinder.

It is a requirement for all electronic fuel injection systems for internal combustion engines that the quantity of air inducted by the engine be measured under different operating conditions.

In fact the control of the engine depends upon proper control of the metering of fuel-air mixture, the ratio of which generally oscillates around the stoichiometric ratio according to the operating regime and load. Under any operating conditions it is therefore necessary to know the quantity of air inducted so as to be able to supply the quantity of fuel able to realise the required fuel-air mixture ratio.

The determination of the quantity of air inducted can be carried out in a direct or indirect way. In the first case devices are used which are inserted in series with the induction conduit to give a direct measure of the quantitative air flow: these devices generally measure volumetric or mass flow rate. In the second case the quantity of inducted air is determined a posteriori, for a given type of engine and for a specific preparation, on the basis of experimental tests on a brake test bench.

The fundamental parameters which identify the specific operating conditions, in the case of indirect measurements, are the number of revolutions of the engine and the absolute pressure in the induction manifold or the angle of opening of the throttle, the two latter quantities being correlated with each other.

In fuel injection systems with a single throttle the mean pressure in the induction manifold is measured. Such systems because of the inevitable presence of a plenum chamber formed within the induction manifold between the inlet valves and the throttle, does not in practice respond to the variations in atmospheric pressure while if one applies the system to an injection system with a single throttle per cylinder variation of atmospheric pressure causes a variation in the mean pressure measured, as will be shown later.

In engines of the aforesaid type having a throttle for each cylinder it is usual to measure the pressure in the portions at least one induction conduit downstream of the throttle and to derive from it the mean value. With this system, however, a pressure is detected which, as will be shown later, depends upon the atmospheric pressure.

An object of the present invention is the provision of a process for determining the quantity of air inducted by a four-stroke internal combustion Otto cycle engine with fuel injection and four cylinders, having one throttle per cylinder, using a system of indirect measurement of the rate of flow of inducted air, so that this measurement is not influenced by variations of atmospheric pressure. A further object of the invention is to provide a device for carrying out such a process which is easy to manufacture at a low cost and which gives optimum precision in any type of application.

According to the present invention in one aspect there is provided a process for determining the rate of flow of air inducted into a four cylinder fuel injection Otto cycle engine having one throttle per cylinder, in which the pressure of the inducted air is measured by a transducer or sensor located between the throttle and the inlet valve of at least one cylinder, the resulting pressure signal being sampled within a precise range of angular positions of the engine crankshaft.

In another aspect the invention provides a device for carrying out the process referred to above comprising a phonic wheel driven by the engine, a detector for detecting the dead centre position of a member rotating at the speed of the engine, a synchronisation detector associated with a member rotating at half the speed of the engine, a pressure transducer sensing the pressure in an induction manifold stub pipe between the throttle and the associated inlet valve of at least one cylinder, amplifier means for the pressure signals from the said pressure transducer, a pick-up cooperating with the phonic wheel to provide electrical pulses, means for forming from the said pulses and the outputs of said dead centre detector and of the said synchronization detector synchronization signals which are applied to a first input of first switching means and to a first input of a counter, the output of the said first switching means being applied to a first input of first gating means the second input of which receives signals derived from the said dead centre detector, the said first gating means being connected to a first input of second switching means which are connected to a first input of second gating means to the second input of which there are applied signals derived from the said phonic wheel pick-up, the output of the said second gating means being applied to a second input of the said counter, means connecting the output of the counter to a first input of a comparator the second input of which receives the output of an angular position preselector, means connecting the output of the comparator to a first input of a switch device and to the second inputs of the said first and second switching means, the switch device having a second input which receives the amplified pressure signals from the said amplifier means, the said switch device being in turn connected to a memory or store which provides an output signal representative of the inducted air flow, sampled within a precise range of angular positions of the engine crankshaft.

This invention will now be described, by way of non-limiting example, with reference to the accompanying drawings, relating to a four-stroke, four-cylinder engine, in which:

FIG. 7 is a block schematic diagram of a device according to one embodiment of the invention for carrying out the process according to this invention.

Figure 3:
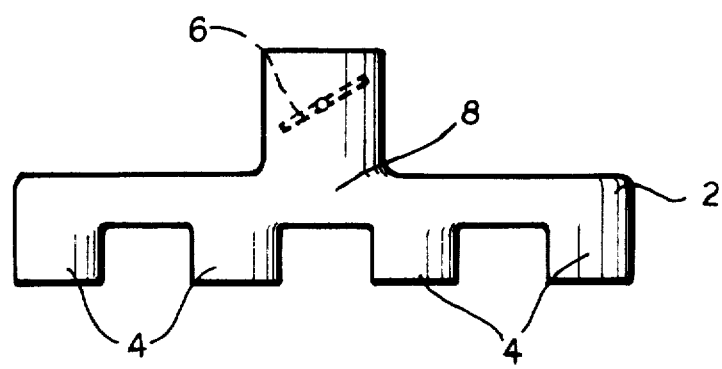
FIG. 3 is a diagrammatic part-sectional view of an induction manifold having a single throttle.

In FIG. 3 reference numeral 2 indicates the induction manifold of a four-cylinder internal combustion Otto cycle engine with a single throttle, the manifold having four stub pipes 4 upstream of respective inlet valves (not shown) of the four cylinders of the engine. The induction manifold 2 has a single throttle 6 controlling the supply of air by way of a chamber 8 disposed upstream of the inlet valves.

Figure 4:
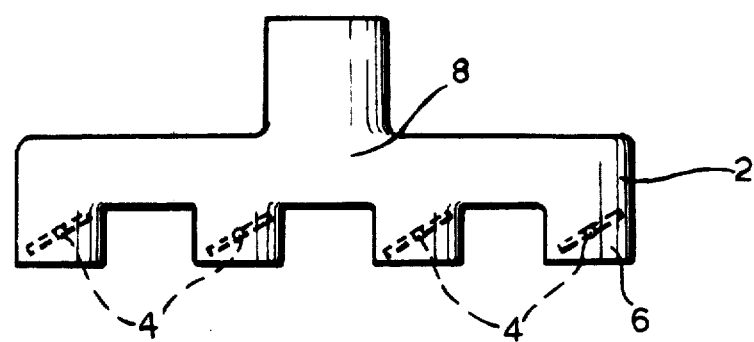
FIG. 4 is a diagrammatic part-sectional view of an induction manifold having one throttle for each engine cylinder.

FIG. 4 shows an induction manifold 2 of an engine to which the present invention is applied. The manifold 2 had four throttles 4 connected to and operated by the accelerator pedal (not shown) of the motor vehicle, each throttle 4 being located in a respective stub pipe of the manifold leading to a respective inlet valve of the engine (not shown). A pressure transducer for measuring the rate of flow of air in accordance with the invention is located in one of the stub pipes, 6.

In FIG. 7 reference numeral 2 indicates an internal combustion four-cylinder fuel injection engine having an induction manifold with four stub pipes 4 provided with respective throttles 6 for controlling the supply of air to the four cylinders of the engine, the throttles 6 being interconnected. A pressure sensing transducer 8 is disposed in one of the cylinders between the respective throttle 6 and the associated inlet valve (not shown) of the cylinder. A wheel 10 carrying a tooth 12 is driven by the engine 2 and cooperates with a first electrical pick-up 14. A phonic wheel 16 carrying a pair of diametrically opposed teeth 18 cooperates frontally with a second pick-up 20, while a third pick-up 22 cooperates with teeth 23 on the periphery of the phonic wheel 16, which is driven at the engine rotational speed for example by connection to the engine crankshaft.

The electrical signals provided by the pick-ups 14, 20, 22 are passed to respective forming circuits 24, 26, 28. The output of the forming circuit 24 is applied to a set input 30 of a bistable multivibrator 32 with set-reset.

The output of the bistable multivibrator 32 is passed to a first input 34 of an AND gate 36 the second input 38 of which receives the output of the forming circuit 26. The output of the AND gate 36 is passed to a set input 40 of a bistable multivibrator 41 with set-reset the output of which is connected to a first input 42 of an AND gate 44 the second input 46 of which receives the output of the forming circuit 28. The output of the AND gate 44 is passed to a first input 48 of a counter 50 the second input 52 of which receives the output of the forming circuit 24.

The counter 50 is connected to a first input 53 of a comparator circuit 54 to the second input 56 of which there is connected the output of an angular position preselector 58. The pressure transducer 8 is connected to an amplifier 60 the output of which is connected to a first input 62 of an electronic switch device 64 the second input 66 of which receives the output of the comparator circuit 54, which is also applied to the reset inputs 68 and 70 respectively of the bistable multivibrators 32 and 41. The output of the electronic switch device 64 is passed to an analogue memory 72 connected to an amplifier adaptor 74 which in turn is connected to an operating gear or actuator (not shown).

Before discussing the process according to this invention it is necessary to examine some typical operating conditions.

Figure 1:
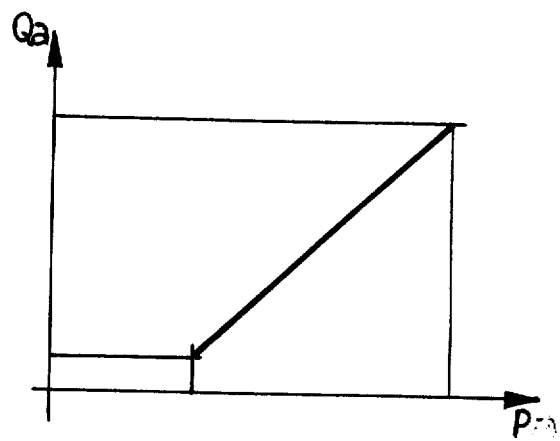
FIG. 1 represents graphically the variation of the quantity of inducted air $Qa$ as a function of the mean pressure $Pm$ in an internal combustion Otto cycle engine having four cylinders and a single throttle.

Consideration will first be given to an internal combustion fuel injection engine having an induction manifold such as that shown in FIG. 3 with a single throttle valve for all the cylinders. Under bench brake test running conditions at a constant number of engine revolutions and air temperature the rate of induction of air is measured for different degrees of opening of the throttle. A characteristic graph such as FIG. 1 will be obtained in which the abscissa represents the mean pressure $Pm$ in the induction manifold and the ordinate the quantity $Qa$ of air inducted per cycle: it will be seen that the resulting plot is a straight line which does not pass through the origin.

It will now be supposed that the atmospheric pressure varies, for example as a result of climbing from sea level to an altitude. The pressure in the induction manifold will vary, but as there is a considerable volume between each inlet valve and the throttle, indicated by the chamber 8 in FIG. 3, the mean pressure in the induction manifold will not be appreciably influenced by the variation of atmospheric pressure. The reason for this is that the single throttle allows a practically continuous flow of air into the induction manifold because, at any given moment, one of the cylinders of the engine is in induction and therefore the variation of density of the air as a consequence of atmospheric pressure variation does not lead to significant difference between the pressure actually existing in this cylinder downstream of its inlet valve and the mean pressure measured in the manifold.

Therefore in air supply systems with a single throttle a single pressure detector can be used in the induction manifold immediately upstream of the inlet valves. Since in a four stroke, four cylinder engine with a single throttle the four induction strokes together cover the whole operating cycle, the instantaneous pressure in the induction manifold downstream of the throttle in consequence fluctuates slightly so that the mean value of this pressure can be confused with its instantaneous value. In particular the pressure, to a good approximation, compares with that of the air inducted into the cylinder at the closing of the relative inlet valve. In conclusion it can be said that in a system with regulation of air by means of a single throttle, the mean value of the absolute pressure in the induction manifold is unequivocally correlatable, given parity of all the other conditions, to the mass of air inducted per cycle and such correlation is of the linear type.

In particular, the mean value of the pressure downstream the regulation throttle, for a given temperature, determines the density of air inducted into the cylinders and for its evaluation in terms of mass it is not necessary to know the atmospheric pressure.

Figure 2:
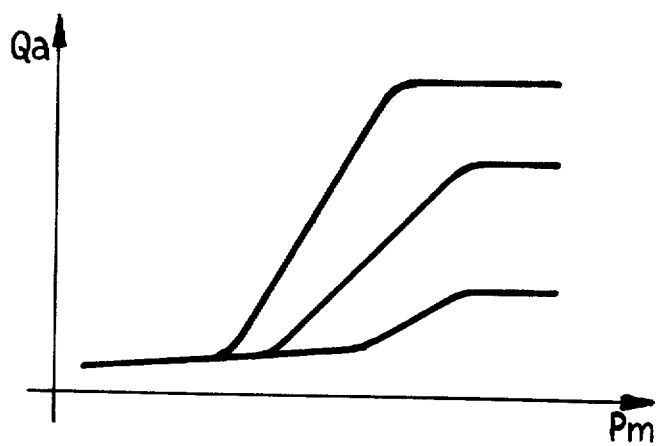
FIG. 2 represents graphically the same parameters as FIG. 1 in the case of an internal combustion Otto cycle engine having four cylinders with one throttle per cylinder.

The case of particular interest here will now be considered, that is, a fuel injection, four-cylinder, four-stroke internal combustion engine with one throttle per cylinder employing an induction manifold as shown schematically in FIG. 4, in which the throttles are interconnected and operated simultaneously by the vehicle accelerator pedal. It will be supposed that the manifold is fitted to the same engine and bench-tested to obtain a graphical plot corresponding to FIG. 1, and under the same conditions, to obtain from detectors which measure the pressure existing in the stub pipes of the induction manifold situated between each throttle and the associated cylinder the plot illustrated in FIG. 2. The abscissa in FIG. 2 represents the mean value $Pm$ of the absolute pressure in the induction manifold obtained by taking the mean of the values provided by the detectors, while the ordinate represents the mass quantity of air $Q_a$ inducted by the engine in each operating cycle.

It will be seen that in this case variation of the atmospheric pressure results in a family of curves. This it is observed experimentally that for a given throttle opening it is not possible to obtain a unique correlation between the mean pressure measured in the induction manifold and the quantity of inducted air. The reason for the marked difference between the plot of FIG. 2 and that of FIG. 1 lies in the wide variation of the pressure; in fact the volume in the manifold downstream of the throttle which is characteristic of the single-throttle manifold of FIG. 3 is absent from the multiple-throttle manifold of FIG. 4, and the pressure measured in the induction manifold is strongly influenced by the atmospheric pressure variation.

Figure 5:
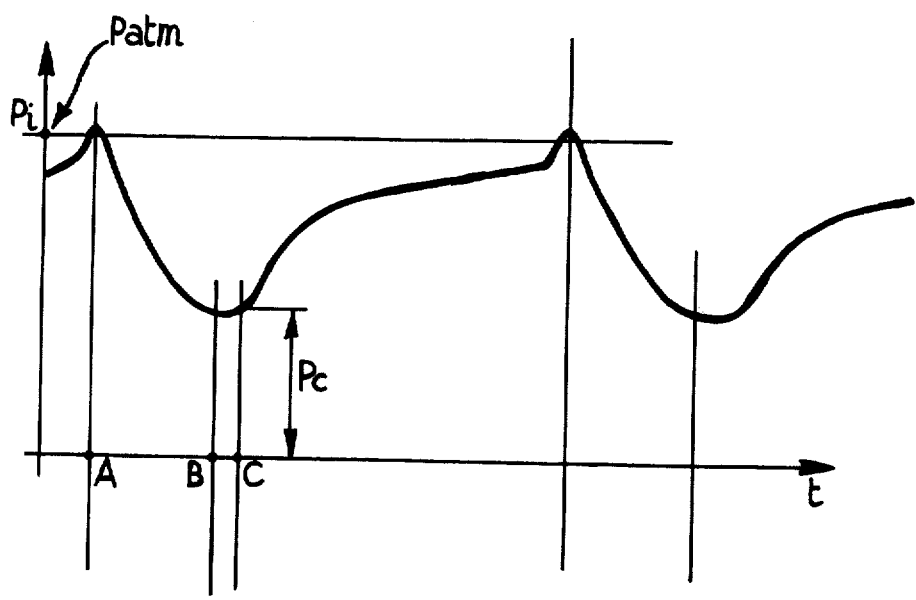
FIG. 5 represents graphically the variation with time $t$ of the instantaneous pressure $Pi$ in a cylinder of a four-cylinder engine having one throttle for each cylinder.
Figure 6:
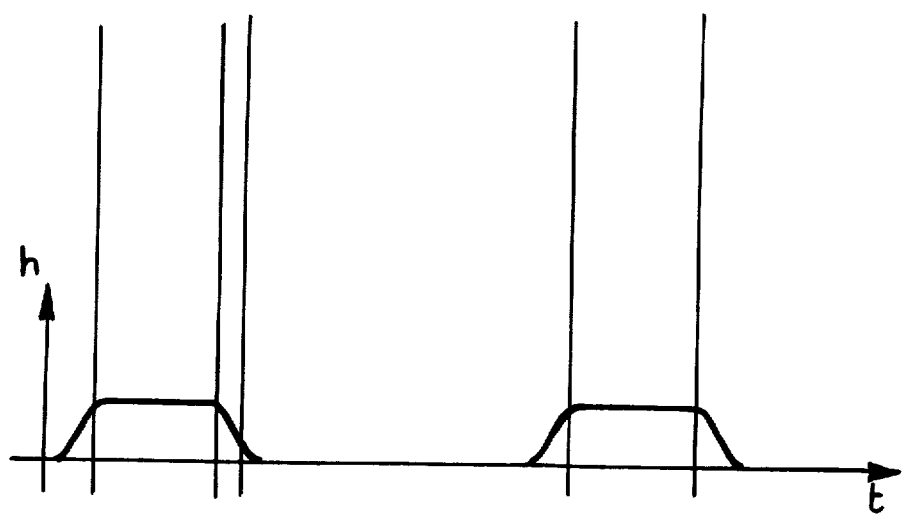
FIG. 6 represents the cyclic lift movements of the inlet valve corresponding to the cylinder to which FIG. 5 refers.

In FIGS. 5 and 6 there are shown respectively graphical plots of typical variation with time $t$ of the instantaneous pressure $P_i$ in one of the induction stub pipes 6 of the manifold 2 of FIG. 4, and inlet valve movement in a four-cylinder, four-stroke engine of the type to which the present invention relates. The ordinate in FIG. 5 represents the instantaneous pressure $P_i$ while the ordinate in FIG. 6 represents the lift $h$ of any inlet valve associated with each respective stub pipe 6 in the induction manifold of FIG. 4.

The time interval represented by A-B-C is the time that the inlet valve associated with one of the cylinders is open. During this time the pressure $P_i$ in the associated stub pipe falls while the respective piston descends during its induction stroke, until the valve closes (around point C). Beginning from point C the pressure $P_i$ rises, air being inducted through the throttle and reaching the atmospheric pressure Patm after a more or less short time according to the degree of closure of the throttle. In FIGS. 5 and 6 conditions of strong choking are represented, and in this regime the pressure has no time to reach the atmospheric value; atmospheric pressure is however reached and even exceeded upon opening of the inlet valve, by virtue of the overlap of the induction period and the exhaust period (in other words, the exhaust gases expanding into the induction conduit).

During the time the respective inlet valve is open the pressure within the associated cylinder follows the pressure in the induction conduit downstream of the respective throttle and differs from this latter pressure only by the pressure drop across the inlet valve itself, a drop which can be allowed for in the volumetric computation.

Meanwhile the pressure in the cylinder upon closure of the inlet valve differs very little from the pressure Pc shown in FIG. 5. The pressure Pc therefore, for a given temperature, gives to a good approximation a measure of the density of air which takes part in the engine operating cycle. Therefore the pressure signal derived from a sampled cylinder at this moment can be used to derive the rate of flow of the air.

The most suitable moment for detecting the pressure signal depends mainly on the lag angle of the closure of the inlet valve and must in any case be determined by successive trials for each type of engine. The pressure must be detected by means of a suitable transducer of sufficiently fast response so as not to distort appreciably the instantaneous signal even at high engine rotational speeds. With an electronic device which will be described later, it is possible to detect the pressure only in correspondence with a particular value of the engine crankshaft angle. That is, the sampling of the pressure is carried out at a suitable moment synchronised with the angular position of the engine crankshaft. It has been found experimentally that for a 1800 cc engine with an inlet valve closure lag of 20° the pressure should be sampled at 10°–30° after the bottom dead centre position (BDC) of the piston under examination, and preferably at 15°–20° after bottom dead centre. In any case the most suitable time is very near the closure of the inlet valve.

Under these conditions a system for the regulation of inducted air with as many throttles as there are cylinders is completely equivalent to a system with a single throttle provided that one takes as a parameter the pressure sampled at a suitable phase of engine shaft rotation instead of the mean pressure. In particular the sampled pressure and the instantaneous engine speed (number of engine revolutions) form a pair of independent parameters which permit recognition univocally and with good approximation of the operating point of the engine, so that each time the engine starts to function under conditions corresponding to the same pair of parameters, the quantity of inducted air will be the same, apart from a correction for temperature.

A device which carries out the process according to this invention will now be described with reference to FIG. 7, which is a block schematic diagram of one embodiment of the device.

The phonic wheel 16, of known type, is mounted on the crankshaft, not shown, of a fuel injection engine to rotate at the engine speed. The phonic wheel 16 is provided with two sets of teeth. The first set of teeth 23 are spaced apart at regular intervals on the periphery of the wheel, allowing evaluation of the crank angle measured by the pick-up 22. The second set of teeth on the phonic wheel 16 consists of two teeth 18 only in correspondence with the upper and lower dead centre positions detected by the detector 20.

On the engine camshaft, not shown, which rotates at one half the crankshaft speed, there is splined the wheel 10 having a single tooth 12 which transmits to the pick-up 14 synchronisation signals; these signals will clearly comprise one pulse for each two revolutions of the engine.

The mechanical system is such that if it is desired to sample the pressure in the cylinder where the pressure transducer 8 is located the opportune moment for such sampling is that comprised between two successive signals of dead centre position counted from the arrival of a synchronised signal.

The signals provided by the pick-ups 14, 20, 22 are clipped by the forming circuits 24, 26, 28 respectively. The synchronising signal from the pick-up 14, after being formed or shaped, is applied to the bistable multivibrator 32, setting the latter. The AND gate 36 allows the passage of the dead centre signals provided by the pick-up 20. The signal provided by the gate 36 trips the bistable multivibrator 41, the output signal from which enables the AND gate 44 to pass the signals from the phonic wheel pick-up 22.

The synchronising signal also resets the counter 50 which therefore, beginning with the dead centre, advances one count each time one of the teeth 23 passes under the pick-up 22.

In the angular position preselector 58 the angular position of the engine crankshaft at which it is desired to sample the pressure signal detected by the transducer 8 is set and amplified by the amplifier 60; when the counter 50 has counted a number of teeth 23 corresponding to the engine crankshaft angle set in the preselector 58 the comparator 54 provides a signal which is passed to the electronic switch device 64. The switch device 64 is closed if a control signal is present (in this case the signal coming from the comparator 54) and is open-circuited in the absence of a control signal. By this means the variable pressure signal supplied by the amplifier 60 is allowed to pass only for a short instant, equal to the duration of the control pulse supplied by the comparator 54 and is stored in the memory 72.

The memory 72 is in effect a condensor of small capacity which is charged almost instantaneously to the value transmitted through the electronic switch device 64 and discharges slowly through the corresponding resistance of a discharge circuit, with a time constant much greater than the longest repetition period of the sampling (that is, engine idling conditions). The amplifier adaptor 74 transmits the signal received by the memory 72 to the utilisers of the sampled signal connected downstream of the amplifier adaptor 74 and not shown in FIG. 7.

The amplifier adaptor 74 has a high input impedance for optimal functioning of the memory 72 and a low output impedance for the correct functioning of the utilisers connected downstream of the amplifier adaptor 74.

We claim:

1. Process for determining the rate of flow of air inducted into a four cylinder fuel injection Otto cycle engine having one throttle per cylinder and inlet valves in each cylinder, wherein the pressure of the inducted air is measured by a transducer located between the throttle and the inlet valve of at least one said cylinder, and the resulting pressure signal is sampled within a precise range of angular positions of the engine crankshaft.

2. A process as in claim 1 wherein the engine has an inlet valve closure delay angle of 20° and wherein the pressure signal is sampled between 15° and 25° after the bottom dead centre position of the engine crankshaft.

3. Device for determining the rate of flow of air inducted into a four cylinder fuel injection Otto cycle engine having an induction manifold, a plurality of stub pipes leading from the induction manifold into each cylinder, an inlet valve associated with each cylinder, and a throttle located in each stub pipe, the device comprising a phonic wheel driven by the engine, a pick-up cooperating with the phonic wheel to generate pulses on rotation of the phonic wheel, a first member which rotates at the speed of the engine, a detector for detecting the dead centre position of said first member, a second member which rotates at half the speed of the engine, and a synchronization detector associated with said second member, wherein the improvement consists in the device further comprising in combination:
 (i) a pressure transducer responsive to the pressure in the respective induction manifold stub pipe between one of said throttles and the associated inlet valve of at least one cylinder of the engine;
 (ii) amplifier means for the pressure signals from the said pressure transducer;
 (iii) first switching means having first and second inputs;
 (iv) second switching means having first and second inputs;
 (v) a counter having first and second inputs;
 (vi) first and second gating means each having a first and a second input;
 (vii) a comparator having first and second inputs;
 (viii) means applying synchronization signals from the synchronization detector to said first input of the first switching means and to the first input of the counter;
 (ix) means applying the output of the said first switching means to the first input of said first gating means;
 (x) means connecting the second input of said first gating means to said dead centre detector to receive signals therefrom;
 (xi) means connecting the output of the first gating means to the first input of said second swtiching means, the output of which is applied to the first input of said second gating means;
 (xii) means connecting the second input of the second gating means to the phonic wheel pick-up to receive pulses therefrom, the output of said second gating means being applied to the second input of said counter;
 (xiii) an angular position preselector;
  (xiv) means connecting the output of said counter to the first input of the comparator;
 (xv) means connecting the second input of the comparator to the output of said angular position preselector;
 (xvi) a switch device having first and second inputs;
 (xvii) means connecting the output of the comparator to the first input of said switch device and to the second inputs of said first and second switching means, the second input of the switch device receiving the amplified pressure signals from said amplifier means;
 (xvii) memory means, and
 (xviii) means connecting the switch device to said memory means, which provide an output signal representative of the inducted air flow, sampled within a precise range of angular positions of the engine crankshaft.

4. A device as in claim 3, wherein the memory means comprise a capacitance store.

5. A device as in claim 3 wherein the switch device comprises an electronic switch.

6. A device according to claim 3, wherein the switching means comprise respective bistable multivibrators with set-reset.

7. A device according to claim 3, wherein the gating means comprises respective AND gates.

* * * * *